US008724350B2

(12) United States Patent
Shen et al.

(10) Patent No.: US 8,724,350 B2
(45) Date of Patent: May 13, 2014

(54) POWER SUPPLY CIRCUIT WITH TEMPERATURE COMPENSATION AND ELECTRONIC DEVICE

(75) Inventors: Jian-She Shen, Shenzhen (CN); Zhen-Sen Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 83 days.

(21) Appl. No.: 13/332,381

(22) Filed: Dec. 21, 2011

(65) Prior Publication Data

US 2013/0077363 A1 Mar. 28, 2013

(30) Foreign Application Priority Data

Sep. 22, 2011 (CN) .......................... 2011 1 0283681

(51) Int. Cl.
*H02M 3/335* (2006.01)

(52) U.S. Cl.
USPC .................................... 363/21.18; 363/21.15

(58) Field of Classification Search
USPC ............ 363/21.07, 21.08, 21.04, 21.09, 21.1, 363/21.11, 21.12, 21.15, 21.17
See application file for complete search history.

(56) References Cited

U.S. PATENT DOCUMENTS 5,699,239 A * 12/1997 Komori ...................... 363/21.07
6,888,108 B2 * 5/2005 Carr ............................. 219/483
6,940,733 B2 * 9/2005 Schie et al. ................ 363/21.12

* cited by examiner

*Primary Examiner* — Nguyen Tran
(74) *Attorney, Agent, or Firm* — Novak Druce Connolly Bove + Quigg LLP

(57) ABSTRACT

An exemplary power supply circuit for providing a driving voltage to a load includes a pulse width modulation (PWM) control circuit, a transformer, a voltage output terminal, and a temperature compensation circuit. The PWM control circuit is configured for outputting a pulse signal. The transformer is configured for converting a first direct current (DC) voltage to a second DC voltage according to the pulse signal. The voltage output terminal is configured for outputting the driving voltage based on the second DC voltage. The temperature compensation circuit includes a temperature sensor for detecting an operation temperature of the load and correspondingly generating a detecting signal, and a feedback signal transmitter for outputting a feedback signal based on the detecting signal. The PWM control circuit adjusts a duty ratio of the pulse signal according to the feedback signal outputted by the temperature compensation circuit.

20 Claims, 2 Drawing Sheets

POWER SUPPLY CIRCUIT WITH TEMPERATURE COMPENSATION AND ELECTRONIC DEVICE

BACKGROUND

1. Technical Field

The present disclosure relates to power supply technology, and more particular, to a power supply circuit with temperature compensation and an electronic device using the power supply circuit.

2. Description of Related Art

Power supply circuits are widely used in electronic devices to provide power for components of the electronic devices. For example, a light emitting diode (LED) may receive a fixed voltage to operate.

However, if temperature of the LED increases during operation, because the voltage is fixed, current through the LED will rise, which may damage or shorten the life of the LED.

What is needed is to provide a power supply circuit that can overcome the above-described limitations.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views, and all the views are schematic.

DETAILED DESCRIPTION

Reference will now be made to the drawings to describe certain exemplary embodiments of the present disclosure in detail.

Figure 1:
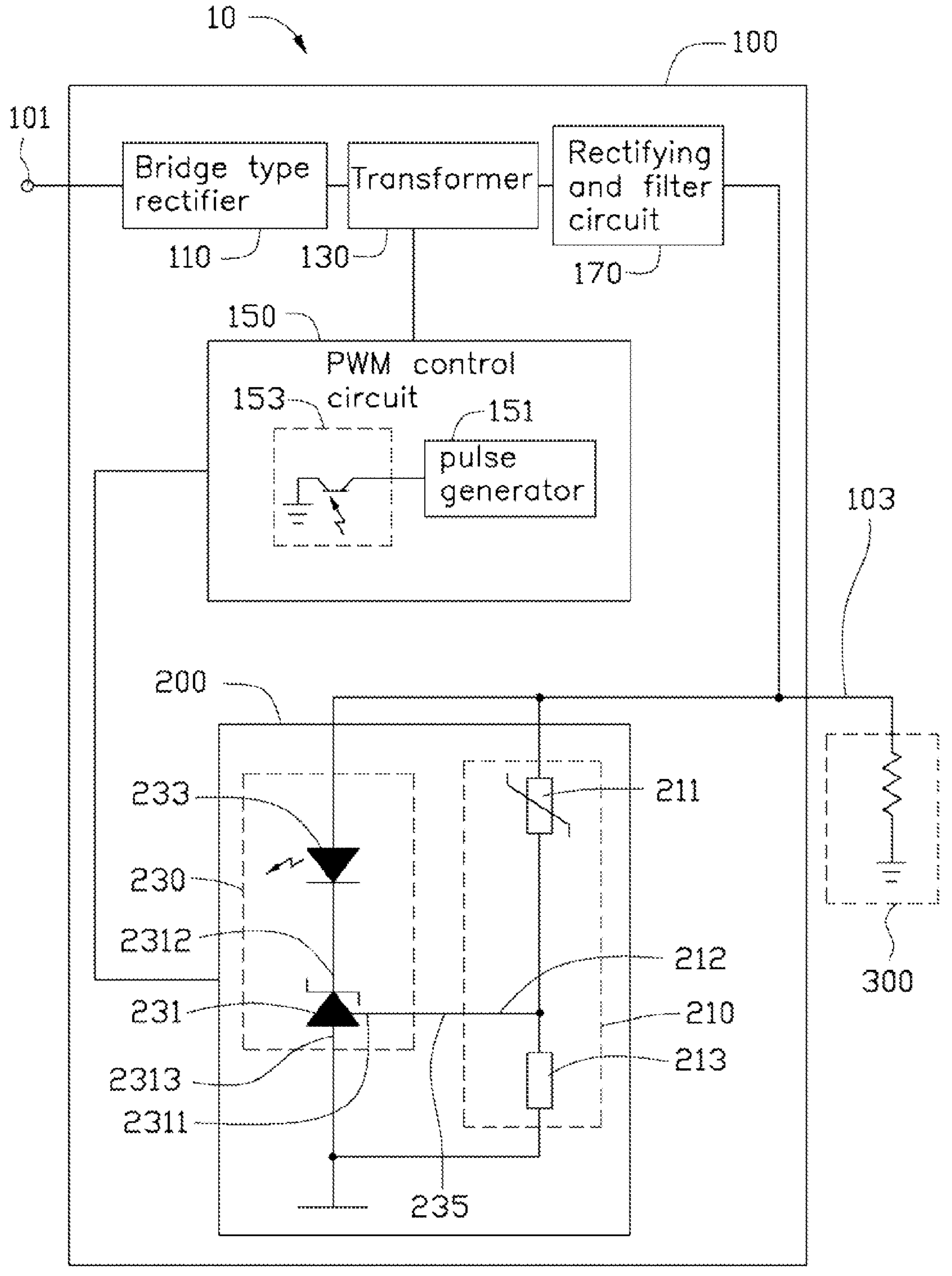
FIG. 1 is a circuit diagram of a power supply circuit according to an embodiment of the present disclosure.

FIG. 1 is a circuit diagram of a power supply circuit according to an embodiment of the present disclosure. The power supply circuit 10 may be adapted to provide a driving voltage to a load 300 such as an LED. The driving voltage may be adjusted according to current temperature of the load 300. The circuit 10 includes a bridge type rectifier 110, a transformer 130, a rectifying and filtering circuit 170, a pulse width modulation (PWM) control circuit 150, and a temperature compensation circuit 200.

The rectifier 110 is electrically coupled to an alternate current (AC) voltage input terminal 101 of the circuit 10. The rectifier 110 rectifies an AC input voltage received by the terminal 101, and converts the voltage into a first direct current (DC) voltage.

The transformer 130 and the rectifying and filter circuit 170 cooperatively form a DC voltage converter for converting the first DC voltage into a driving voltage output to the load 300. The transformer 130 is electrically coupled to the bridge type rectifier 110, the PWM control circuit 150, and the rectifying and filter circuit 170. The transformer 130 transforms the first DC voltage into a second DC voltage having a desired value according to a pulse signal output by the PWM control circuit 150. The rectifying and filter circuit 170 is electrically coupled between the transformer 130 and a voltage output terminal 103 of the power supply circuit 10. The rectifying and filter circuit 170 rectifies the second DC voltage output by the transformer 130, filters the rectified DC voltage, and provides the rectified voltage to the load 300 via the voltage output terminal 103.

The temperature compensation circuit 200 is in parallel with the load 300 and ground, and is electrically coupled to the voltage output terminal. Moreover, the temperature compensation circuit 200 is further optically coupled to the PWM control circuit 150. The optical couplings are described in detail below. The temperature compensation circuit 200 detects variation in resistance of the load 300 due to a change in temperature of the load 300, and outputs an optical feedback signal indicating the change in resistance to the PWM control circuit 150. The PWM control circuit 150 receives the feedback signal, and adjusts a duty ratio of the pulse signal output to the transformer 130 accordingly. The adjustment of the duty ratio controls the transformer 130 to increase or decrease the second DC voltage, to compensate for the change in resistance.

In one embodiment, to ensure proper operation of the load 300, an equivalent resistance of the temperature compensation circuit 200 is much greater than the resistance of the load 300.

The temperature compensation circuit 200 includes a temperature sensor 210, a current adjust unit 231, and a feedback signal transmitter 233. The temperature sensor 210 includes a thermal resistor 211 and a divider resistor 213. The thermal resistor 211 and the divider resistor 213 are electrically coupled in series between the voltage output terminal 103 and the ground. A node between the thermal resistor 211 and the divider resistor 213 serves as an output terminal 212 of the temperature sensor 210, that is, the output terminal 212 can output a voltage of the divider resistor 213 as a detecting signal to the current adjust unit 231.

The thermal resistor 211 has a same temperature characteristic as the load 300. For example, if the load 300 has a negative temperature coefficient (NTC), i.e., the resistance of the load 300 decreases when the operation temperature of load 300 increases, the thermal resistor 211 has a negative temperature coefficient (NTC), and vice versa.

The feedback signal transmitter 233 may be an LED that can vary in brightness according to current flowing through it. The feedback signal transmitter 233 is electrically connected between the voltage output terminal 103 and the current adjust unit 231. The current adjust unit 231 adjusts the driving current of the feedback signal transmitter 233 according to the detecting signal outputted from the temperature sensor 210. The current adjust unit 231 may be a three terminal adjustable shunt regulator having a control terminal 2311, a first connection terminal 2312, and a second connection terminal 2313. The control terminal 2311 is electrically connected to the output terminal 212 of the temperature sensor 210 to receive the detecting signal, the first connection terminal 2312 is electrically coupled to the feedback signal transmitter 233, and the second connection terminal 2313 is grounded.

In particular, when the detecting signal received by the control terminal 2311 is greater than a predetermined reference signal, the current adjust unit 231 increases the current through the feedback signal transmitter 233, increasing brightness of the light emitted by the feedback signal transmitter 233; when the detecting signal is less than the predetermined reference signal, the current unit 231 reduces the current through the feedback signal transmitter 233, decreasing brightness of the light emitted by the feedback signal transmitter 233. As such, the light emitted by the feedback signal transmitter 233 serves as the optical feedback signal output to the PWM control circuit 150.

The PWM control circuit 150 includes a pulse generator 151 and a feedback signal receiver 153. The feedback signal receiver 153 may be a photo diode that receives the optical feedback signal from the feedback signal transmitter 233, and converts the optical feedback signal into a feedback voltage corresponding to the brightness of the optical feedback signal. In particular, the feedback signal receiver 153 and the feedback signal transmitter 233 may be integrated into a one-piece component, such as an optical coupler. The pulse generator 151 generates and outputs a pulse signal to the transformer 130 according to the feedback voltage provided by the feedback signal receiver 153. When the feedback voltage increases, the pulse generator 151 correspondingly decreases the duty ratio of the pulse signal; when the feedback voltage decreases, the pulse generator 151 correspondingly increases the duty ratio of the pulse signal.

For example, using the load 300 with an LED having a NTC, resistance of the load 300 decreases due to an increase in temperature of the load 300, the resistance of the thermal resistor 211 also decreases because the thermal resistor 211 and the load 300 have a same temperature characteristic, the detecting signal (i.e. the voltage of the divider resistor 213) correspondingly increases and causes current through the feedback signal transmitter 233 to increase. As such, brightness of the optical feedback signal output by the feedback signal transmitter 233 increases.

The optical feedback signal is then received by the feedback signal receiver 153 of the PWM control circuit 150, and is converted into an increased feedback voltage. The increased feedback voltage further triggers the pulse generator 151 to decrease the duty ratio of the pulse signal, and thus the transformer 130 is controlled to output a decreased second DC voltage to lower the output voltage applied to the load 300, to maintain current of the load 300 at a desired value, and thus compensating for the decreased resistance of the load 300 caused by the increase in temperature of the load 300.

If the load 300 has a positive temperature coefficient, the temperature compensation mechanism of the power supply circuit 10 is similar to the above-described example, which may control the output voltage of the power supply circuit 10 to be increased, and thus compensating a resistance increase of the load 300 caused by the increase of operation temperature.

Figure 2:
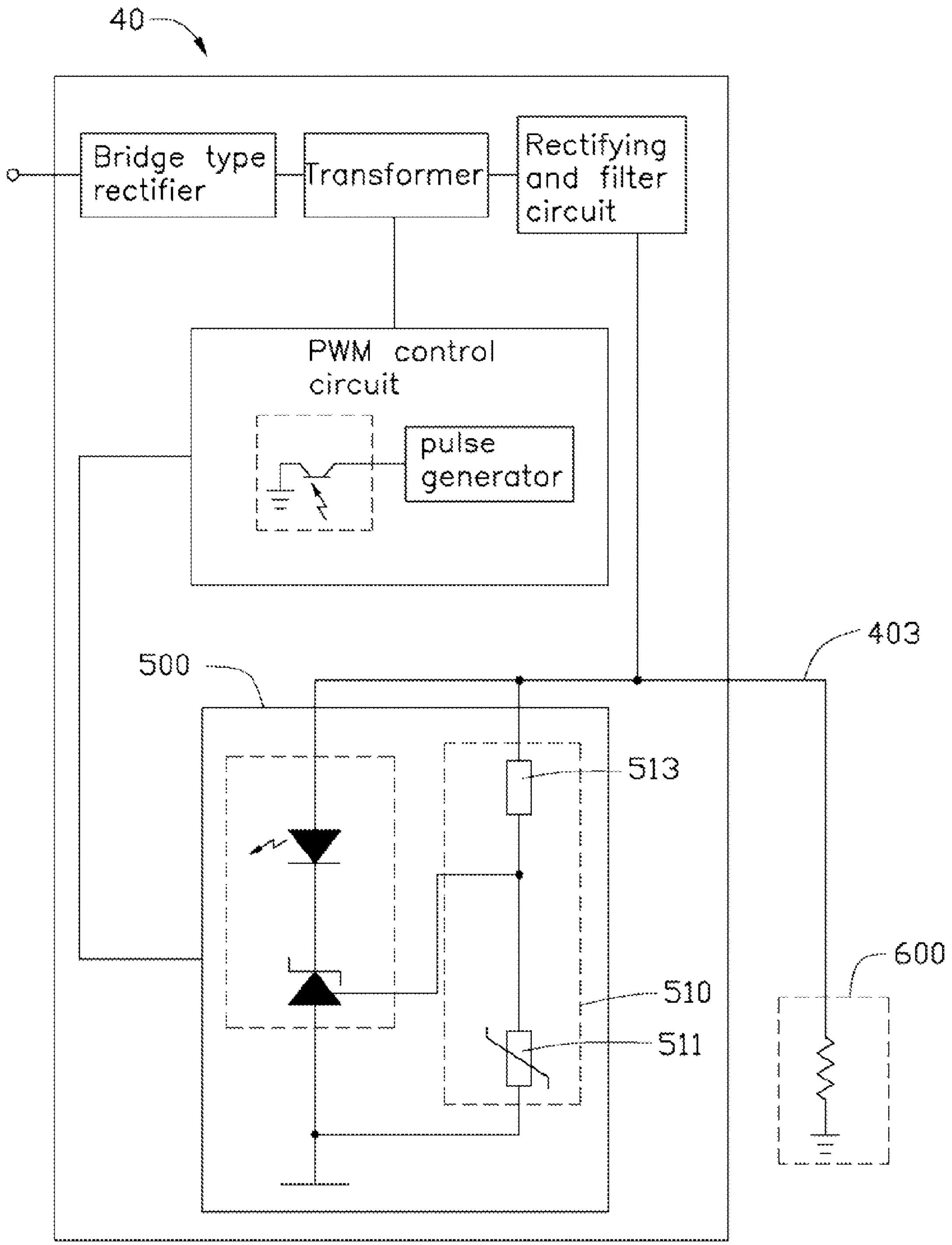
FIG. 2 is a circuit diagram of a power supply circuit according to another embodiment of the present disclosure.

FIG. 2 is a circuit diagram of a power supply circuit 40 according to another embodiment of the present disclosure. The power supply circuit 40 is similar to the power supply circuit 10 as illustrated in FIG. 1, but differs in that: a temperature compensation circuit 500 of the power supply circuit 40 includes a temperature sensor 510 having a divider resistor 513 electrically coupled to a voltage output terminal 403, and a thermal resistor 511 electrically coupled between the divider resistor 513 and the ground; moreover, the thermal resistor 511 has a temperature characteristic opposite to a load 600. For example, when the thermal resistor 511 has a positive temperature coefficient (PTC), the load 600 has a NTC. The power supply circuit 40 compensate for temperature changes like the power supply circuit 10, to maintain desired current through the load 600.

It is to be further understood that even though numerous characteristics and advantages of preferred and exemplary embodiments have been set out in the foregoing description, together with details of the structures and functions of the embodiments, the disclosure is illustrative only; and that changes may be made in detail, especially in matters of shape, size and arrangement of parts within the principles of the present disclosure to the full extent indicated by the broad general meaning of the terms in which the appended claims are expressed.

What is claimed is:

1. A power supply circuit for providing a driving voltage to a load, comprising:
- a pulse width modulation (PWM) control circuit for outputting a pulse signal;
- a transformer for converting a first direct current (DC) voltage into a second DC voltage according to the pulse signal;
- a voltage output terminal for outputting the driving voltage based on the second DC voltage;
- a temperature compensation circuit comprising a temperature sensor for detecting an operation temperature of the load and correspondingly generating a detecting signal, and a feedback signal transmitter for outputting a feedback signal based on the detecting signal;
- wherein the PWM control circuit adjusts a duty ratio of the pulse signal according to the feedback signal outputted by the temperature compensation circuit;
- wherein when the detecting signal indicates that the operation temperature of the load increases, the feedback signal is an increased feedback signal triggering the PWM control circuit to decrease the duty ratio of the pulse signal, and when the detecting signal indicates that the operation temperature of the load decreases, the feedback signal is a decreased feedback signal triggering the PWM control circuit to increase the duty ratio of the pulse signal.

2. The power supply circuit of claim 1, wherein the temperature sensor comprises a thermal resistor and a divider resistor electrically coupled in series between the voltage output terminal and ground.

3. The power supply circuit of claim 2, wherein the thermal resistor has a same temperature characteristic as the load, one end of the thermal resistor is electrically coupled to the voltage output terminal, and the other end of the thermal resistor is grounded via the divider resistor.

4. The power supply circuit of claim 3, wherein the thermal resistor and the load both have a negative temperature coefficient.

5. The power supply circuit of claim 2, wherein the thermal resistor has a temperature characteristic opposite to the load, one end of the divider resistor is electrically coupled to the voltage output terminal, and the other end of the divider resistor is grounded via the thermal resistor.

6. The power supply circuit of claim 5, wherein the thermal resistor has a positive temperature coefficient, and the load has a negative temperature coefficient.

7. The power supply circuit of claim 1, wherein the temperature compensation circuit further comprises a current adjust unit for adjusting a driving current of the feedback signal transmitter according to the detecting current outputted from the temperature sensor.

8. The power supply circuit of claim 7, wherein the current adjust unit is an adjustable shunt regulator comprising a control terminal for receiving the detecting signal, a first connection terminal electrically coupled to the feedback signal transmitter, and a second connection terminal being grounded.

9. The power supply circuit of claim 8, wherein the feedback signal transmitter is a light emitting diode (LED) for outputting an optical signal with a corresponding brightness according to the driving current, the optical signal serves as the feedback signal outputted to the PWM control circuit.

10. The power supply circuit of claim 9, wherein the PWM control circuit comprises a feedback signal receiver and a pulse generator, the feedback signal receiver is configured for receiving the optical signal from the feedback signal transmitter and converting the optical feedback signal into a feedback voltage corresponding to the brightness of the optical signal, the pulse generator is configured for generating the pulse signal according to the feedback voltage provided by the feedback signal receiver.

11. The power supply circuit of claim 10, wherein the feedback signal receiver and the feedback signal transmitter is integrated into a one-piece optical coupler.

12. An electronic device, comprising:

a load;

a power supply circuit for providing a driving voltage to the load though a voltage output terminal, the power supply circuit comprises a pulse width modulation (PWM) control circuit, a direct current (DC) voltage converter, and a temperature compensation circuit;

wherein the DC voltage converter is configured for converting a primary DC voltage into the driving voltage according to a pulse signal provided by the PWM control circuit; the temperature compensation circuit comprises a temperature sensor for detecting an operation temperature of the load, and a feedback signal transmitter for outputting a feedback signal based on the operation temperature of the load; the PWM control circuit adjusts a duty ratio of the pulse signal according to the feedback signal outputted by the temperature compensation circuit;

wherein when the detecting signal indicates that the operation temperature of the load increases, the feedback signal is an increased feedback signal triggering the PWM control circuit to decrease the duty ratio of the pulse signal, and when the detecting signal indicates that the operation temperature of the load decreases, the feedback signal is a decreased feedback signal triggering the PWM control circuit to increase the duty ratio of the pulse signal.

13. The electronic device of claim 12, wherein the temperature sensor comprises a thermal resistor and a divider resistor electrically coupled in series between the voltage output terminal and ground.

14. The electronic device of claim 13, wherein the thermal resistor has a same temperature characteristic as the load, one end of the thermal resistor is electrically coupled to the voltage output terminal, and the other end of the thermal resistor is grounded via the divider resistor.

15. The electronic device of claim 14, wherein the thermal resistor and the load both have a negative temperature coefficient.

16. The electronic device of claim 13, wherein the thermal resistor has a temperature characteristic opposite to the load, one end of the divider resistor is electrically coupled to the voltage output terminal, and the other end of the divider resistor is grounded via the thermal resistor.

17. The electronic device of claim 16, wherein the thermal resistor has a positive temperature coefficient, and the load has a negative temperature coefficient.

18. The electronic device of claim 12, wherein the temperature compensation circuit further comprises a current adjust unit for adjusting a driving current of the feedback signal transmitter according to a detecting current corresponding to an operation temperature of the load outputted by the feedback signal transmitter.

19. The electronic device of claim 18, wherein the current adjust unit is an adjustable shunt regulator comprising a control terminal for receiving the detecting signal, a first connection terminal electrically coupled to the feedback signal transmitter, and a second connection terminal being grounded.

20. The electronic device of claim 19, wherein the feedback signal transmitter outputs an optical signal with a corresponding brightness according to the driving current, the optical signal serves as the feedback signal outputted to the PWM control circuit; the PWM control circuit comprises a feedback signal receiver and a pulse generator, the feedback signal receiver receives the optical signal from the feedback signal transmitter and converts the optical feedback signal into a feedback voltage corresponding to the brightness of the optical signal, the pulse generator generates and outputs the pulse signal according to the feedback voltage provided by the feedback signal receiver.

* * * * *